Jan. 1, 1957          F. KOSTER          2,776,003
METHOD AND APPARATUS FOR CUTTING TUBING
Filed Sept. 14, 1955
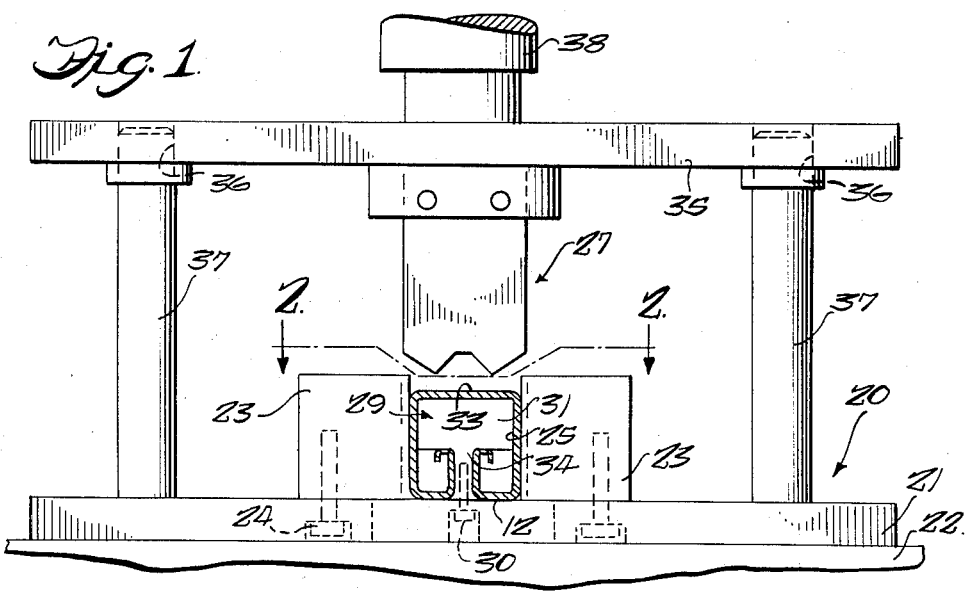
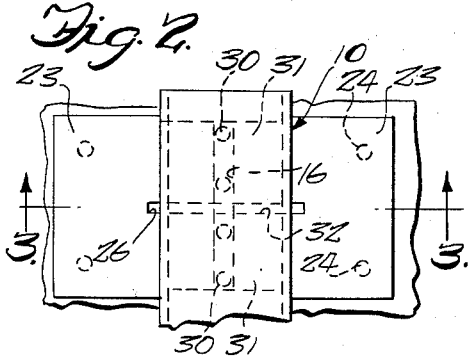
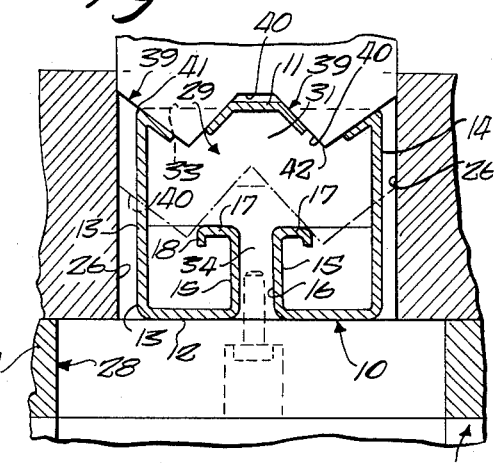
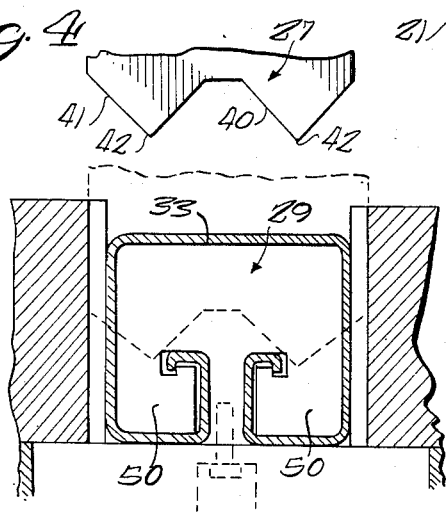
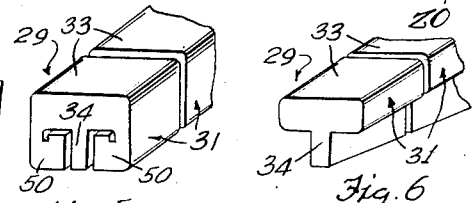
Inventor
Frank Koster
by Hilmond O. Vogel
Attorney United States Patent Office 2,776,003
Patented Jan. 1, 1957

2,776,003

METHOD AND APPARATUS FOR CUTTING TUBING

Frank Koster, Stone Park, Ill., assignor to Vogel Tool & Die Corporation, a corporation of Illinois Application September 14, 1955, Serial No. 534,225

8 Claims. (Cl. 164—17)

This invention relates to an improved method and apparatus for cutting a particularly shaped tubing.

It is a prime object of this invention to provide an improved method and apparatus for cutting a particular type of tubing, having a relatively thin wall provided with an elongated recess defined by a pair of laterally spaced, inwardly extending flanges.

Another object is to provide an improved method and apparatus for cutting inwardly flanged tubing in a manner wherein the flanges of the tubing are cut in a clean and expeditious manner without deformation.

A still further object is to provide an improved method comprising a series of sequential steps in a tube-cutting operation wherein the tube is of a particular shape.

Another object is to provide an improved apparatus for cutting flanged tubing with a guillotine-type cutting knife; the knife having a particular shaped cutting edge adapted to cleanly cut the outer wall of the tube and the internal flanges of the tube.

A still further object is to provide an improved apparatus for cutting internally flanged tubing; the apparatus including mandrel means which is inserted within the tubing for supporting the flanges and the inner peripheral wall of the tube during cutting with a guillotine knife, whereby a clean and efficient cut is provided.

These and further objects will become more readily apparent from a reading of the specification when examined in connection with the accompanying drawing.

In the drawing:

Figure 1 is a side-elevational view, showing a tube inserted therein, of an apparatus for cutting internally flanged tubing to length;

Figure 2 is a cross-sectional view taken along the line 2—2 of Figure 1;

Figure 3 is a cross-sectional view taken along the line 3—3 of Figure 2;

Figure 4 is a cross-sectional view, similar to Figure 3, showing a modified embodiment of the invention.

Figure 5 is a detail view of portions of a perspective modified mandrel also shown in Figure 4; and Figure 6 is a detail perspective view of a mandrel also shown in Figure 1;

Referring now to Figures 1 through 3, a substantially rectangular tube is designated generally by the reference character 10. The tube 10 comprises an upper wall 11 and a lower wall 12, suitably, integrally connected by means of side walls 13 and 14. The terms "upper" and "lower" are, of course, merely relative, depending on the normal cutting position of the tube, as indicated.

The lower wall 12 is split, as indicated, by means of inwardly extending flanges 15 which are laterally spaced to provide a recess 16 which is generally longitudinally coextensive with the length of the tube. The flanges 15 each include transversely, outwardly extending flanges, or lips, 17 of generally L-shaped design; each lip having a downwardly extending portion 18. The type of tubing shown is generally in great demand because of its extreme strength afforded by the inturned flanges. It generally, however, has heretofore been extremely difficult to cut into lengths, and the usual method of sawing has been too costly and too time consuming.

An apparatus for cutting tubing is generally indicated by the reference character 20. The apparatus 20 comprises a base 21 adapted to be suitably supported on the bolster 22 of a press (not shown). A pair of die blocks 23 are supported on the base 21 by means of screws 24. The die blocks are suitably separated laterally to provide an opening 25 for receiving the tubing 10. The die blocks 23 are also suitably recessed to provide oppositely disposed guide slots 26 for receiving a shearing blade, or knife, generally designated by the reference character 27. The base 21 is suitably cut out, as indicated at 28, to provide for the discharge of cut slugs which originate during the cutting operation.

As indicated in the figures, the tube 10 is positioned between the die blocks 23. A mandrel 29 is secured to the base 21 by means of screws 30. The mandrel 29 comprises a pair of T-shaped members 31 which are separated, as indicated in Figure 3, to provide a shearing opening 32. The mandrel has an enlarged transverse portion 33 which supports the upper wall 11 and portions of the side walls 13 and 14.

The mandrel 29 further includes a stem portion 34 which suitably supports the flanges 15 against collapse during cutting.

The blade 27 is suitably connected to an upper plate 35, having openings 36 for receiving guide pins 37 fastened to the base 21. The plate 35 is suitably positioned for vertical movement during reciprocation of a ram 38 of a power press.

The blade 27 is guided by the recesses 26. It consists of a pair of V-shaped cutting edges 39 having inner and outer edges 40 and 41 and a piercing tip 42. During reciprocation of the blade 27, it will be noted that the path of travel of the piercing points 42 is disposed laterally of, or transversely with respect to, the flanges 15 and L-shaped portions 17.

In operation, the tube 10 is positioned between the die blocks 23, and the blade 27 is moved downwardly. The piercing points 42 initially pierce the upper wall 11, the cutting edges 40 shear the material inwardly, and the edges 41 shear the material outwardly. By virtue of the double V-shaped edge of the blade, and the positioning of the piercing points, the inner edges 40 shear the flanges 15 and 17 during the simultaneous shearing of the walls 12 and 13. A clean and efficient cut is thus secured, since the internal portions of the tube are adequately supported by the novel mandrel arrangement disclosed.

In the modification of Figure 4, the parts are all identical, and are identified by the same reference characters as in Figures 1 through 3. The mandrel 29 has, in addition to the enlarged portion 33 and the stem 34, hook-shaped supporting members 50 which complement the shape of the flanges 17 and portions 18 to provide a support for the same during shearing movement of the blade, or knife, 27. This type of mandrel may be desirable when cutting to length very thin wall tubing where complete support of the flanges is desired.

Thus it is apparent that an improved process and apparatus for cutting inwardly flanged tubing has been disclosed, and that the objects of the invention have been fully achieved. The shapes of the blade and the mandrel in operation provide an improved apparatus for cutting this particular tubing to length.

It must be understood that changes and modifications may be made which do not depart from the invention as disclosed nor the scope thereof as defined in the appended claims.

What is claimed is:

1. A method of cutting tubing into lengths, the tubing having top, bottom, and side walls and having flanges on one of said walls turned inwardly toward the axis of the tube, said flanges being relatively laterally spaced to provide an elongated recess longitudinally coextensive with said tube, comprising: the steps of supporting the tube by confining the side walls between dies positioned externally against said side walls, providing a T-shaped mandrel in said tube, the mandrel having a narrow leg portion extending into said recess for supporting said flanges, the mandrel also having a wide lateral portion internally supporting said top wall and portions of the side wall, moving a knife with laterally spaced V-shaped cutting edges into cutting engagement with said top wall adjacent said dies and mandrel to initially penetrate said top wall at laterally spaced points, further moving said knife, thereby progressively shearing inner and outer portions of said top wall until said top wall is severed, then progressively shearing the side walls of the tube outwardly, then progressively shearing the flanges inwardly, and then progressively shearing the bottom wall of said tube to complete severance of the tube.

2. A method of cutting tubing into lengths, the tubing having top, bottom, and side walls and having flanges on one of said walls turned inwardly toward the axis of the tube, said flanges being relatively laterally spaced to provide an elongated recess longitudinally coextensive with said tube, comprising: the steps of supporting the tube by confining the side walls between dies positioned externally against said side walls, providing a mandrel in said tube, the mandrel having a narrow leg portion extending into said recess for supporting said flanges, the mandrel also having a laterally extending portion internally supporting said top wall and portions of the side wall, moving a knife with laterally spaced V-shaped cutting edges into cutting engagement with said top wall adjacent said dies and mandrel to initially penetrate said top wall at laterally spaced points, further moving said knife, thereby progressively shearing inner and outer portions of said top wall until said top wall is severed, then progressively shearing the side walls of the tube outwardly, then progressively shearing the flanges inwardly, and then progressively shearing the bottom wall of said tube to complete severance of said tube.

3. A method of cutting tubing into lengths, the tubing having top, bottom, and side walls and having flanges on one of said walls turned inwardly toward the axis of the tube, said flanges being relatively laterally spaced to provide an elongated recess longitudinally coextensive with said tube, comprising: the steps of supporting the tube by confining the side walls between dies positioned externally against said side walls, providing a mandrel in said tube, the mandrel having a narrow leg portion extending into said recess for supporting said flanges, the mandrel also having a laterally extending portion internally supporting said top wall and portions of the side wall, moving a knife with laterally spaced V-shaped cutting edges into cutting engagement with said top wall adjacent said dies and mandrel to initially penetrate said top wall, further moving said knife, thereby progressively shearing portions of said top wall until said wall is severed, then shearing the side walls of the tube outwardly, then progressively shearing the flanges inwardly, and then progressively shearing the bottom wall of said tube to complete severance of said tube.

4. Apparatus for shearing tubing into lengths, the tubing having a wall with inner and outer peripheral surfaces and a longitudinally extending recess in said wall defined by a pair of laterally spaced flanges extending inwardly toward the axis of the tube, comprising: a base, die means mounted on said base, said die means including a first opening adapted to receive a tube and confine the outer peripheral surface of the wall of the tube in supporting relation, said die having a shearing opening extending transversely with respect to said first opening for receiving a cutting blade in shearing relation, a T-shaped mandrel mounted on said base, said mandrel having a leg connected to said base and extending in the recess of a tube into said tube, said mandrel having an enlarged transversely extending portion engaging the inner peripheral surface of the wall adjacent said shearing opening in supporting relation, a cutting blade reciprocally mounted above said shearing opening, and means for reciprocating said blade in said shearing opening, said cutting blade having a pair of laterally spaced V-shaped cutting edges, each cutting edge having inner and outer edges terminating in a piercing edge, each piercing edge having a path of travel disposed laterally outwardly of the flanges of said tube, the piercing edges during movement of the blade toward said shearing opening being adapted to engage and pierce a tube wall at laterally spaced points whereupon said wall is progressively sheared, and said inner edges are adapted to shear said flanges.

5. Apparatus for shearing tubing into lengths, the tubing having a wall with inner and outer peripheral surfaces and a longitudinally extending recess in said wall defined by a pair of laterally spaced flanges extending inwardly toward the axis of the tube, comprising: a base, die means mounted on said base, said die means including a first opening adapted to receive a tube and confine the outer peripheral surface of the wall of the tube in supporting relation, said die having a shearing opening extending transversely with respect to said first opening for receiving a cutting blade in shearing relation, a T-shaped mandrel mounted on said base, said mandrel having a leg connected to said base and extending in the recess of a tube into said tube, said mandrel having a transversely extending portion engaging the inner peripheral surface of the wall adjacent said shearing opening in supporting relation, a cutting blade reciprocally mounted above said shearing opening, and means for reciprocating said blade in said shearing opening, said cutting blade having a pair of laterally spaced V-shaped cutting edges, each cutting edge having inner and outer edges terminating in a piercing edge, each piercing edge having a path of travel disposed laterally outwardly of the flanges of said tube, the piercing edges during movement of the blade toward said shearing opening being adapted to engage and pierce a tube wall at laterally spaced points whereupon said wall is progressively sheared, and said inner edges are adapted to shear said flanges.

6. Apparatus for shearing tubing into lengths, the tubing having a wall with inner and outer peripheral surfaces and a longitudinally extending recess in said wall defined by a pair of laterally spaced flanges extending inwardly toward the axis of the tube, comprising: a base, die means mounted on said base, said die means including a first opening adapted to receive a tube and confine the outer peripheral surface of the wall of the tube in supporting relation, said die having a shearing opening extending transversely with respect to said first opening for receiving a cutting blade in shearing relation, a T-shaped mandrel mounted on said base, said mandrel having a leg connected to said base and extending in the recess of a tube into said tube, said mandrel having a transversely extending portion engaging the inner peripheral surface of the wall adjacent said shearing opening in supporting relation, a cutting blade reciprocally mounted above said shearing opening, and means for reciprocating said blade in said shearing opening, said cutting blade having a pair of laterally spaced V-shaped cutting edges, each cutting edge having inner and outer edges terminating in a piercing edge, the piercing edges during movement of the blade toward said shearing opening being adapted to engage and pierce a tube wall at laterally spaced points whereupon said wall is progressively sheared, and said inner edges are adapted to shear said flanges.

7. Apparatus for shearing tubing into lengths, the tubing having a wall with inner and outer peripheral surfaces and a longitudinally extending recess in said wall defined by a pair of laterally spaced flanges extending inwardly toward the axis of the tube, comprising: a base, die means mounted on said base, said die means including a first opening adapted to receive a tube and confine the outer peripheral surface of the wall of the tube in supporting relation, said die having a shearing opening extending transversely with respect to said first opening for receiving a cutting blade in shearing relation, a mandrel mounted on said base, said mandrel having a first portion extending in the recess of the tube for supporting said flanges, said mandrel having a second portion engaging the inner peripheral surface of the wall adjacent said shearing opening in supporting relation, a cutting blade reciprocally mounted above said shearing opening, and means for reciprocating said blade in said shearing opening, said cutting blade having a pair of laterally spaced V-shaped cutting edges, each cutting edge having inner and outer edges terminating in a piercing edge, each piercing edge having a path of travel disposed laterally outwardly of the flanges of said tube, the piercing edges during movement of the blade toward said shearing opening being adapted to initially pierce a tube wall whereupon said wall is progressively sheared, and said inner edges are adapted to shear said flanges.

8. Apparatus for shearing tubing into lengths, the tubing having a wall with inner and outer peripheral surfaces and a longitudinally extending recess in said wall defined by a pair of laterally spaced flanges extending inwardly toward the axis of the tube, said flanges including L-shaped lip portions extending transversely of said flanges, comprising: a base, a die mounted on said base, said die having a tube-receiving opening for supporting said tube and a shearing opening adapted to receive a shearing blade, a mandrel mounted on said base, said mandrel extending through said recess into said tube for supporting said flanges, said mandrel having portions generally conforming and complementing the inner peripheral surface of the wall and the L-shaped lip portions to support the same during shearing, and a cutting blade having laterally spaced V-shaped cutting edges adapted to move through said shearing opening for piercing and cutting the tube wall, the lip portions, and said flanges.

References Cited in the file of this patent

UNITED STATES PATENTS

| | | |
|---|---|---|
| 2,620,030 | Anderson | Dec. 2, 1952 |
| 2,704,124 | Koster | Mar. 15, 1955 |